US007431042B2

(12) United States Patent
Huang

(10) Patent No.: US 7,431,042 B2
(45) Date of Patent: Oct. 7, 2008

(54) PRESSURE RELEASING DEVICE FOR SPRAY PUMP

(75) Inventor: I-Jen Huang, Taichung (TW)

(73) Assignee: Wu Li Agriculture Machine Co., Ltd., Taichung (TW)

( * ) Notice: Subject to any disclaimer, the term of this patent is extended or adjusted under 35 U.S.C. 154(b) by 274 days.

(21) Appl. No.: 11/463,901

(22) Filed: Aug. 11, 2006

(65) Prior Publication Data

US 2008/0035210 A1 Feb. 14, 2008

(51) Int. Cl.
*F16K 11/02* (2006.01)

(52) U.S. Cl. ...................................... 137/107; 137/102

(58) Field of Classification Search ................. 137/102, 137/107, 115.2; 239/127
See application file for complete search history.

(56) References Cited

U.S. PATENT DOCUMENTS 2,367,682 A * 1/1945 Kehle .......................... 91/436
3,007,492 A * 11/1961 Grimmer ............... 137/596.18
3,967,635 A * 7/1976 Sealfon et al. .............. 137/102
4,058,349 A * 11/1977 Ury ............................. 303/69
6,769,450 B2 * 8/2004 Fretwell ..................... 137/107

* cited by examiner

*Primary Examiner*—Stephen M Hepperle
(74) *Attorney, Agent, or Firm*—Leong C. Lei

(57) ABSTRACT

A pressure releasing device contains a tubular body member with a slidable slider member inside. The pressure releasing device is connected to the output of the high-pressure pump and high-pressure water will flows through the pressure releasing device when the pump is turned on and, when the pump is turned off, the high-pressure backflow will force the slider member to quickly block the inlet of the pressure releasing device. A pressure releasing opening controlled by a low-pressure valve is provided along the tubular body member. When the pump is turned off, the high-pressure backflow will be quickly released through the pressure releasing opening and the low-pressure valve helps to keep the water pressure inside the hose below a low pressure level to prevent dripping.

4 Claims, 3 Drawing Sheets

PRESSURE RELEASING DEVICE FOR SPRAY PUMP

BACKGROUND OF THE INVENTION (a) Technical Field of the Invention

The present invention generally relates to spray pumps, and more particularly to a pressure releasing device for quickly releasing the pressure in the hose of a spray pump to avoid dripping from the spray nozzle.

(b) Description of the Prior Art

A high-pressure spray pump is usually connected to a hose which has a spray nozzle at the other end. Water is pressurized by the pump, driven through the hose, and sprayed out via the nozzle. When the pump is turned off, the pressure of the water remaining in the hose cannot be released immediately and the high-pressure water would drip from the spray nozzle continuously until the pressure drops below a certain level, making the operation of the water spray system quite inconvenient. For some water spray systems, even though the pump is not turned on or is turned for a long time, dripping or leakage from the spray nozzle is still inevitable as the pressure of normal tap water is around 7 kg f/cm$^2$. This pressure is not high enough to deliver sprays but, for these water spray systems, is still large enough to cause dripping from the spray nozzle. Conventionally, some sort of electromagnetic valve and timer are provided along the hose of the water spray system to prevent the foregoing problem. However, these additional devices imply a higher cost for the water spray system and increased difficulty in installing and operating the water spray system.

SUMMARY OF THE INVENTION

The primary purpose of the present invention is to provide a pressure releasing device to obviate the foregoing shortcomings of the conventional water spray system.

The pressure releasing device according to the present invention contains a tubular body member with a slidable slider member inside. The pressure releasing device is connected to the output of the high-pressure pump and, by the resilience of a resilient element against the slider member, high-pressure water will flows through the pressure releasing device when the pump is turned on and, when the pump is turned off, the high-pressure backflow will force the slider member to quickly block the inlet of the pressure releasing device.

A pressure releasing opening controlled by a low-pressure valve is provided along the tubular body member. When the pump is turned off, the high-pressure backflow will be quickly released through the pressure releasing opening and the low-pressure valve helps to keep the water pressure inside the hose below a low pressure level to prevent dripping.

An additional benefit of the present invention is that, by maintaining low-pressure water in the hose and in the pressure releasing device, the water spray system can be immediately put to work when the pump is engaged again without waiting for the water to fill up the hose.

The foregoing object and summary provide only a brief introduction to the present invention. To fully appreciated these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a sectional view showing the pressure releasing device of FIG. 1 when it is initially connected to a pump which is not turned on.

FIG. 4 is a sectional view showing how water flows through the pressure releasing device of FIG. 3 when the connected pump is turn on.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
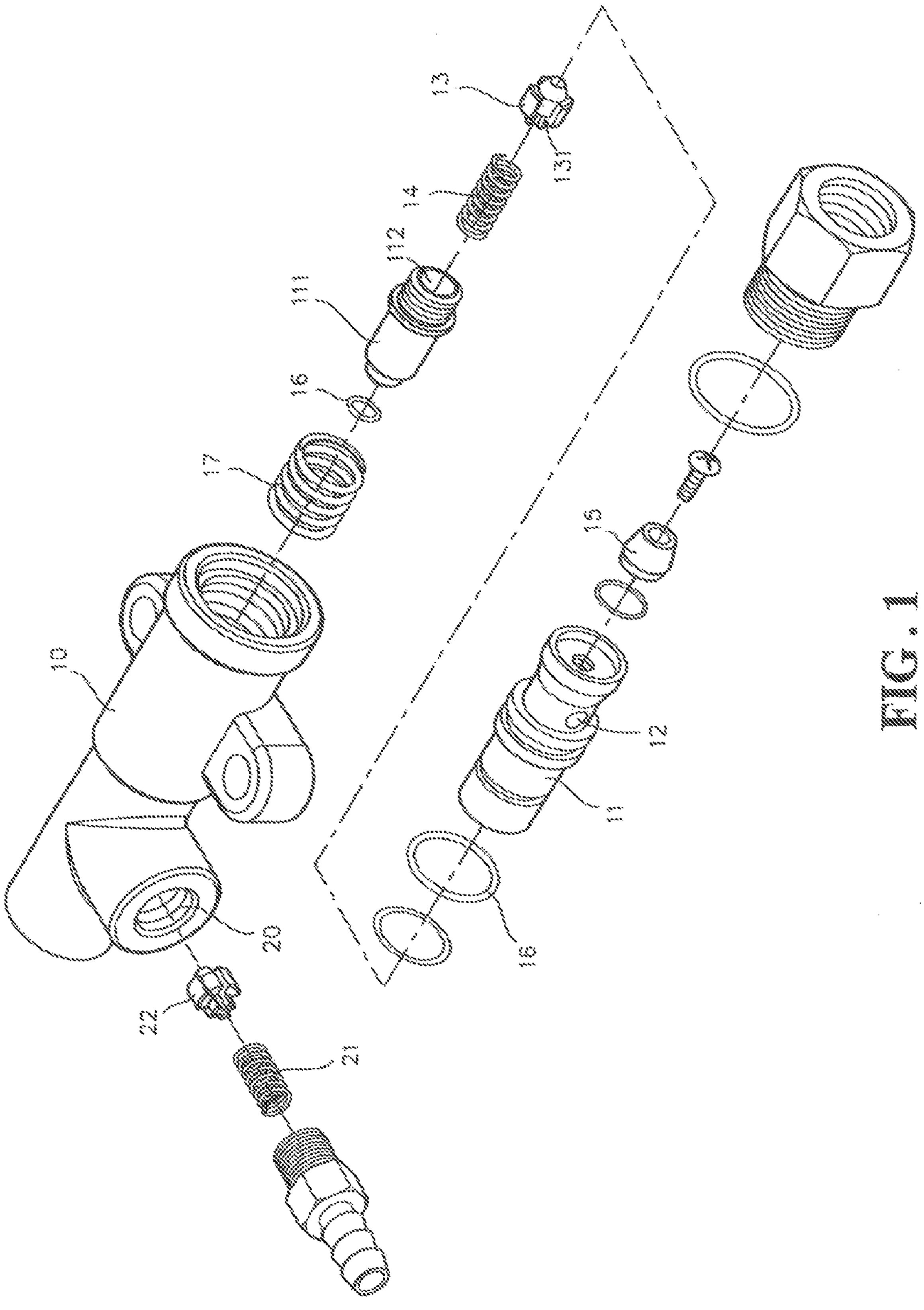
FIG. 1 is a perspective exploded view showing the various components of a pressure releasing device according to an embodiment of the present invention.
Figure 2:
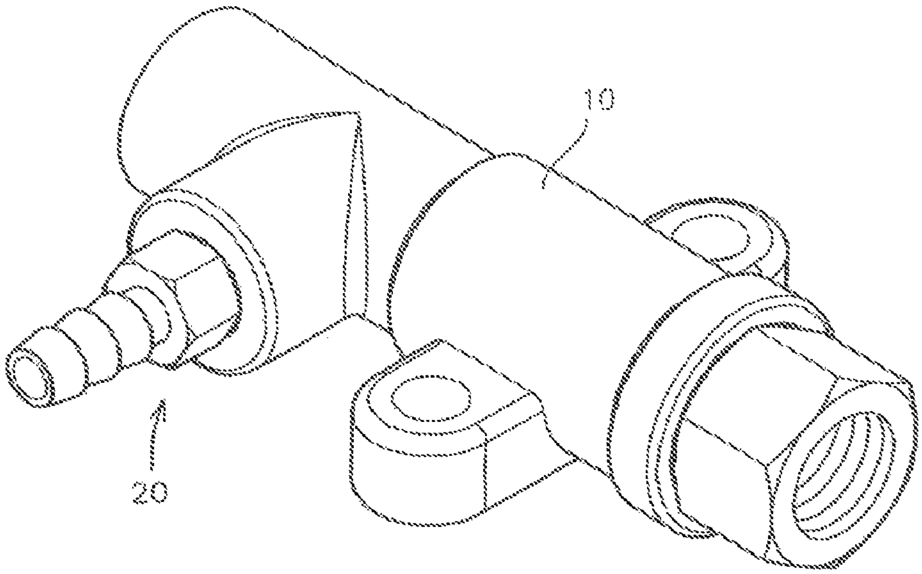
FIG. 2 is a perspective view showing the pressure releasing device of FIG. 1 after its assembly.
Figure 3:
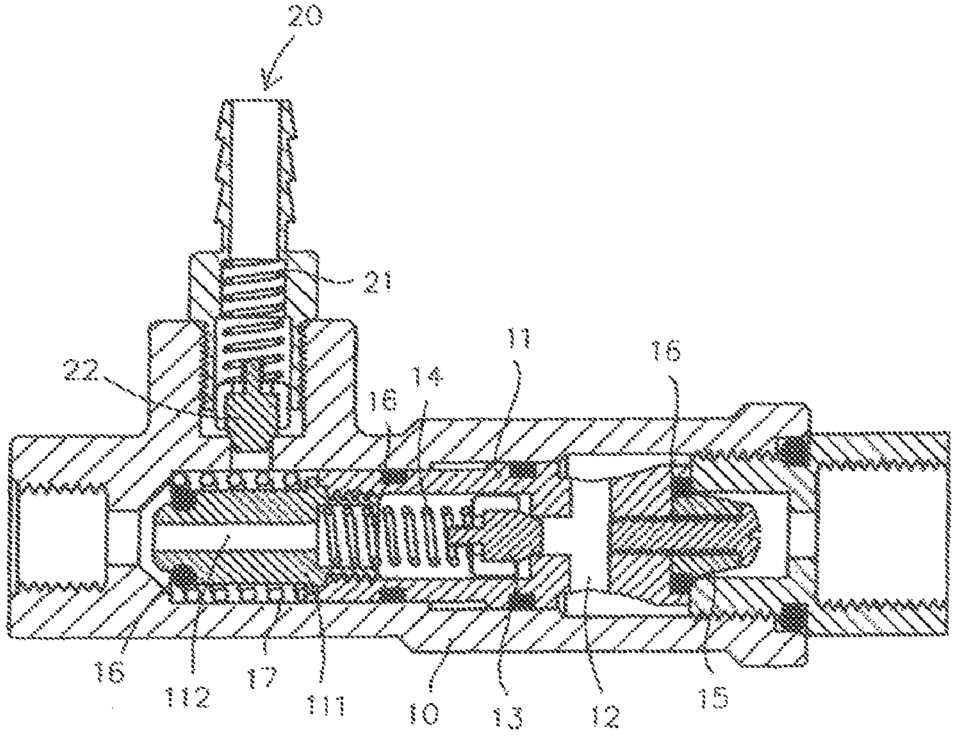
Figure 4:
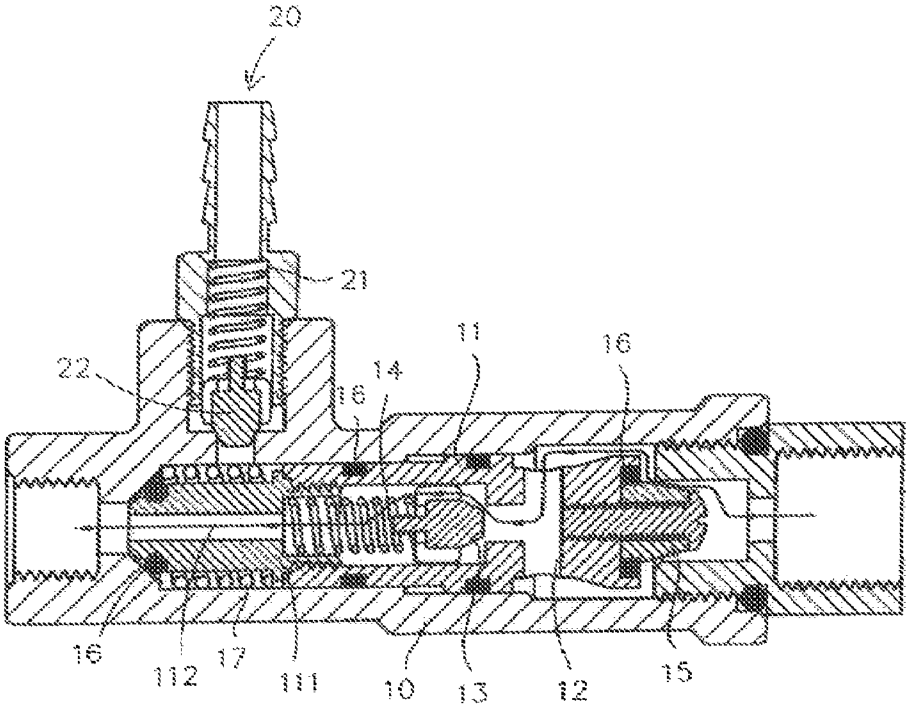
Figure 5:
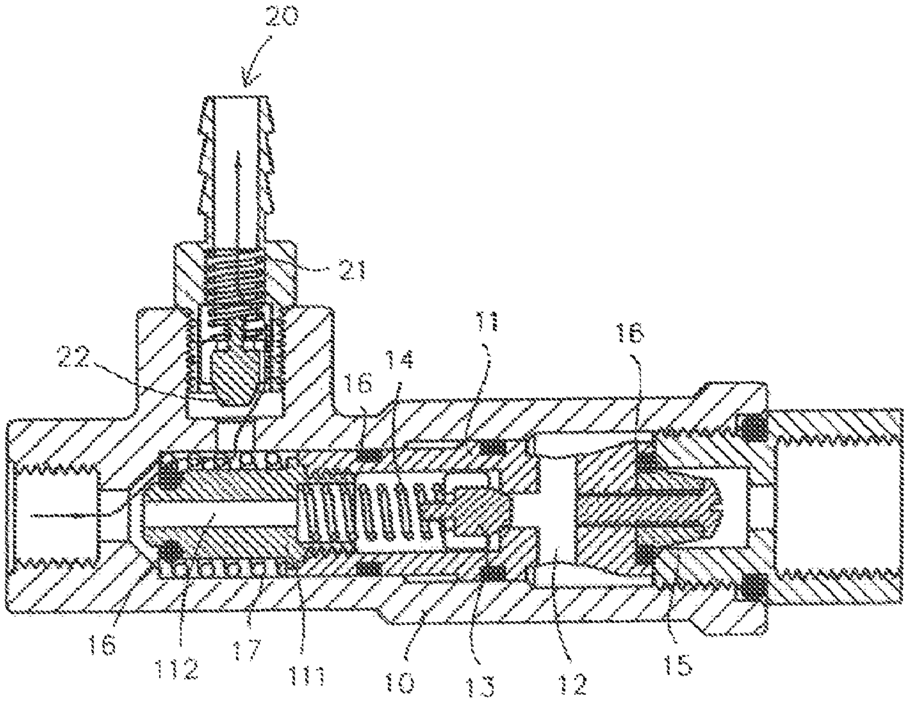
FIG. 5 is a sectional view showing how high-pressure backflow passes through the pressure releasing device of FIG. 4 when the connected pump is subsequently turned off.

As shown in FIGS. 1 to 5, a pressure releasing device according to an embodiment of the present invention mainly contains a tubular body member 10 providing a through passageway where water from a pump enters from an inlet end and exits from an outlet end. Within the passageway, a slider member is slidably provided which is assembled by a cylindrical first piece 11 adjacent to the inlet end and a tubular second piece 111 adjacent to the outlet end. A cone-shaped first plug 15 made of reinforced plastics is configured on a front end of the first piece 11 close to the passageway's inlet end. When there is no water with at least an appropriate pressure, the inlet end of the passageway of the body member 10 is blocked by the first plug 15. The first piece 11 further has a T-shaped tunnel 12 inside behind the first plug 15. The tunnel 12 contains a diametrically oriented channel providing two openings around the circumference of the first piece 11, and an axially oriented channel behind, providing an opening at the back end of the first piece 11. The second piece 111, on the other hand, has an axially oriented channel 112 conducted to the axially oriented channel of the T-shaped tunnel 12. Also inside the slider member and between the channel 112 and the axially oriented channel of the tunnel 12, a second plug 13 and a first resilient element (e.g., a helix spring) 14 are provided in series so that the opening of the axially oriented channel of the tunnel 12 is blocked by the second plug 13 when there is no water with at least an appropriate pressure. Please note that a number of axially oriented ducts 131 are provided around the circumference of the second plug 13.

Around the circumferences of the first and second pieces 11 and 111, a number of elastic washer rings 16 are provided to prevent leakage when the slider member is slid along the passageway. The second piece 111 is threaded in a second resilient element (e.g., a helix spring) 17, which will force the slider member to slide forward to block the inlet end when there is no water with at least an appropriate pressure. As such, when a water pump where the inlet of the pressure releasing device is connected is turned off and the pressure releasing device is under a normal water pressure, no water will leak out of a hose connected to the outlet end of the pressure releasing device. The body member 10 has a radial pressure releasing opening 20 close to the outlet end. The pressure releasing opening 20 is blocked by a third plug 22 pressed against by a third resilient element (e.g., a helix spring) 21.

When the pressure releasing device is put to use, its outlet end is connected to a pump while its outlet end is connected to a hose with a spray nozzle. When the pump is engaged, high-pressure water flows into the pressure releasing device and presses the slider member against the outlet end. In the mean time, the water pushes open the first plug 15, flows around the first piece 11, enters the T-shaped tunnel 12, pushes open the second plug 13, flows through the ducts 131, the channel 112, the hose, and then spurts out of the spray nozzle. When the pump is turned off, the high-pressure water in the hose flows back into the pressure releasing device and, together with the resilience of the second resilient element 17, the slider member is slid to block the inlet end. In the mean time, the high-pressure backflow pushes open the third plug 22 and exits from the pressure releasing opening 20. Please note that the third resilient element 21 is configured to have a weaker resilience around 2 kg f/cm$^2$. Therefore, when the pressure of the backflow drops below this level, the third plug 22 is restored to block the pressure releasing opening 20. In other words, the pressure of the water in the hose and the pressure releasing device will be maintained below this low pressure level. The dripping problem of the spray nozzle when the pump is disengaged therefore can be avoided. On the other hand, as low-pressure water is already filled inside the hose and the pressure releasing device, the water spry system is immediately operational when the pump is turned back on, without waiting for high-pressure water to fill the hose and the pressure releasing device.

In summary, the present invention contains a tubular body member with a slidable slider member inside and a pressure releasing opening at an end. When the pump is turned off, the high-pressure backflow pushes the slider member to block the inlet of the body member and is quickly released from the pressure releasing opening. The water in the hose and the pressure releasing device is maintained at a low pressure level so that the dripping problem is effectively resolved and the water spray system can be immediately put to work when the pump is engaged again.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pressure releasing device comprising:

a body member providing a through passageway having an inlet end connected to a pump and an outlet end connected to a hose, a pressure releasing opening being provided close to said outlet end which is blocked by a third plug pressed against by a low-pressure third resilient element; and a slider member within said passageway having a first piece and a second piece joined in series, said first piece has a first plug on a front end adjacent to and blocking said inlet end, a tunnel inside said first piece having at least an opening around the circumference of said first piece and another opening at a back end of said first piece, said second piece having a channel inside conducted to said tunnel and to said outlet end, a second plug and a first resilient element being provided in series between said channel of said second piece and said tunnel of said first piece so that said opening of said tunnel at said back end is blocked by said second plug, said second piece being threaded in a second resilient element;

wherein, when said pump is engaged, high-pressure water flows into said pressure releasing device and presses said slider member against said outlet end while the water pushes open said first plug, enters said tunnel, pushes open said second plug, flows through said channel of said second piece, and then spurts out of said hose; and, when said pump is turned off, the high-pressure water in said hose flows back into said pressure releasing device and, together with the resilience of said second resilient element, said slider member is slid to block said inlet end while the high-pressure backflow pushes open said third plug and exits from said pressure releasing opening.

2. The pressure releasing device according to claim 1, wherein said tunnel is T-shaped.

3. The pressure releasing device according to claim 1, wherein a plurality of washer rings are provided around the circumferences of said first and second pieces.

4. The pressure releasing device according to claim 1, wherein a plurality of axially oriented ducts are provided around the circumference of said second plug.

* * * * *